G. L. HEMPY.
TRACTION WHEEL.
APPLICATION FILED JULY 9, 1920.
1,404,392. Patented Jan. 24, 1922.
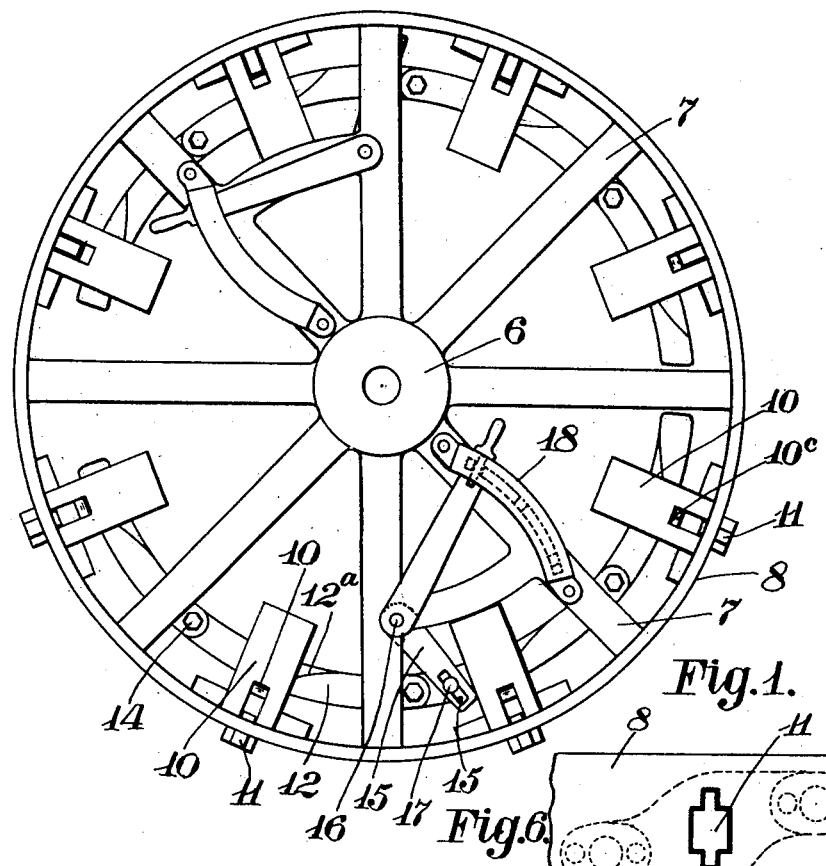
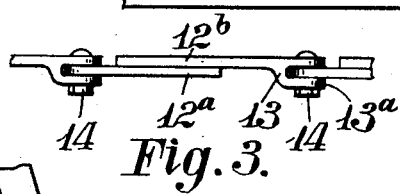
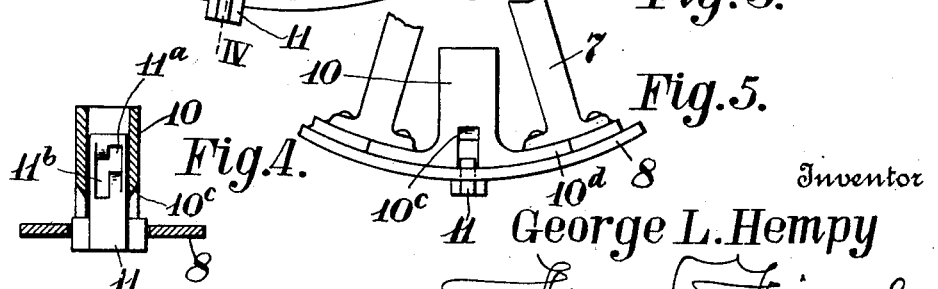
Inventor
George L. Hempy
By Fincel & Fincel
his Attorneys

UNITED STATES PATENT OFFICE.

GEORGE L. HEMPY, OF TRURO TOWNSHIP, FRANKLIN COUNTY, OHIO, ASSIGNOR OF ONE-HALF TO ORLA H. MOSIER, OF COLUMBUS, OHIO.

TRACTION WHEEL.

1,404,392. Specification of Letters Patent. Patented Jan. 24, 1922.

Application filed July 9, 1920. Serial No. 394,944.

*To all whom it may concern:*

Be it known that I, GEORGE L. HEMPY, a citizen of the United States, residing at Truro Township, in the county of Franklin and State of Ohio, have invented a certain new and useful Improvement in Traction Wheels, of which the following is a specification.

The present invention relates to the type of traction wheel shown in the patent issued to me July 8, 1919, No. 1,309,521.

The object of the invention is an improved and simplified construction whereby the projection of the lugs or traction elements is made easier and said elements held more firmly in their projected position.

The invention is embodied in the example herein shown and described, the features of novelty being finally claimed.

In the accompanying drawing:

Figure 1 is a view in elevation of the outer side of a wheel equipped with the invention.

Fig. 2 is a detail in section illustrating the traction element and its operating member.

Fig. 3 is a detail in edge view showing a member for operating the traction element, together with portions of similar members connected therewith.

Fig. 4 is a cross section on the line IV—IV, Fig. 2 omitting the traction element operating member.

Fig. 5 is a detail in side view of a modification of the manner of securing the housing.

Fig. 6 is a plan view of the same.

In the views 6 designates the hub, 7 the spokes, and 8 the rim of a traction wheel, these parts being of suitable construction. The rim has cut or formed in it between the spokes a suitable number of transverse slots, and secured to the inner side of the rim for each of said slots is a housing 10 having a passage $10^a$ alining radially of the wheel. The neck of the housing has a cross passage $10^b$ intersecting at right angles to said radially extending passage $10^a$. Located in each of the passages $10^a$ is the shank of the lug or traction element 11, that element being preferably formed with a head of greater width than the shank. The lateral extensions of the head of the traction element extend into radial recesses in the side of the housing, said recesses being beveled inwardly at their bottom as seen at $10^c$ to form the seat for said head so as to prevent clogging with dirt or stones entering said recesses. In the shank of the traction element or lug is formed a double or compound slot $11^a$, $11^b$, the parts of which are connected by an opening and the bearings of which are rounded. Through this slot and the cross passage $10^b$ in the housing 10 is inserted a compound or double wedge member 12, said member being sustained and guided by the housing. The wedge member 12 has at one side an edge $12^a$ that bears against the shank of the lug at the outer end of the slot $11^b$ and at the other side an edge $12^b$ that bears against the shank at the inner end of the slot $11^a$, so that when the wedge member is moved sufficiently in one direction, to the left as shown in Fig. 2, the traction element is projected beyond the rim of the wheel and when moved in the opposite direction or to the right, said element is drawn inward so as not to project beyond said rim, or so as to be flush therewith.

In the present instance the body of the wedging member is formed as a link, 13, in an arc concentric with the axis of the wheel and the edges $12^a$ and $12^b$ are also made on curves adapted to act on the traction element to cause or permit it to be pushed out or drawn in with little or no lost motion when the operating lever hereinafter referred to is manipulated. The curve of the projecting edge $12^a$ blends into the curve of the link and said edge is so located that when the lug is thrown to full projected position the lug bears radially upon the body of the link and not upon the inclined edge $12^a$.

The several links 13 are each formed with a fork $13^a$ at one end to receive the unforked end of the next link. A suitable number of these links 13 are connected together by screw bolts 14 to provide for the operation of lugs around about the perimeter of the wheel. The links thus connected form a group or chain concentric with the axis of the wheel. To operate this chain there is provided a lever 15 pivoted at 16 on the wheel, one of the arms of said lever having a handle for operating it and the other having a slot $15^a$ engaging a pin 17 at a point in the chain about midway of its ends. The handled end of the lever 15 works under an ordinary suitably notched sector 18 to latch the lever at the position desired to make secure the position of the lugs. The outer position of the handled arm of the lever holds the tractor elements withdrawn and the inner position holds them projected into working position.

Where great strength is desired I propose to mount and secure the housing 10 between the outer ends of the adjacent wheel spokes and the rim. When this is done the housing is provided with extended ears 10$^d$, and the same means that secure the spokes to the rim can be employed to secure the housing as shown in Figs. 5 and 6. When so constructed the pressure on the housing is borne largely by the spokes rather than solely by the means fastening the housing to the rim.

The device thus constructed can be applied to many, if not all, the traction wheels now in common use and it is capable of ready and economical repair. A worn or damaged lug or link can be removed and replaced with a new one.

In practice, that group of traction elements which is uppermost will be first projected and when the engine is moved to bring the other group uppermost that group will be projected. Oftentimes it will be sufficient to project one group only, as where the difficult place is of small area.

The parts are susceptible of some modification without departure from the invention as claimed.

What I claim is:

1. In combination with a wheel having a plurality of slots, housings on the rim coinciding with the slots, said housings having passages radial with reference to the wheel for the reception of traction lugs and cross passages for an actuating member for said lugs extending in a plane coinciding with the plane of the wheel, traction lugs in said radial passages, a chain the links of which have actuating members for said lugs, the said links being curved on an axis concentric with the wheel, and means for actuating said chain.

2. In combination with a wheel having a plurality of slots, housings on the rim coinciding with the slots, said housings having passages radial with reference to the wheel for the reception of traction lugs and cross passages for an actuating member for said lugs extending in a plane coinciding with the plane of the wheel, traction lugs in said radial passages, a chain, the links of which have curved edges for actuating said lugs, and means for actuating said chain.

3. In combination with a wheel having a plurality of slots, housings on the rim coinciding with the slots, said housings having passages radial with reference to the wheel for the reception of traction lugs and cross passages for an actuating member for said lugs extending in a plane coinciding with the plane of the wheel, traction lugs in said radial passages, a chain, the links of which are curved on an axis concentric with the wheel and are provided with differently curved lug-actuating edges blending with the curve of the links and means for actuating said chains.

4. In combination with a spoked wheel having a slot in its rim, a housing for a movable traction element on the rim of the wheel, said housing mounted and secured between the outer ends of adjacent spokes and the rim whereby pressure on the housing is borne by the spokes.

5. In combination with the rim of a wheel having a movable traction lug, a housing having a recess in which said lug travels, the wall forming the bottom of said recess being inwardly beveled to prevent accumulation of dirt therein.

GEORGE L. HEMPY.